United States Patent [19]

Conner, Jr.

[11] 4,195,297
[45] Mar. 25, 1980

[54] SHORT RANGE RADAR TRACKING APPARATUS

[75] Inventor: Leo B. Conner, Jr., Phoenix, Ariz.

[73] Assignee: Motorola, Inc., Schaumburg, Ill.

[21] Appl. No.: 880,669

[22] Filed: Feb. 23, 1978

[51] Int. Cl.² ............................ G01S 9/14; G01S 9/37
[52] U.S. Cl. .................................... 343/12 R; 343/7.3
[58] Field of Search ................................ 343/7.3, 12 R

[56] References Cited

U.S. PATENT DOCUMENTS

| | | | |
|---|---|---|---|
| 3,056,128 | 9/1962 | Ball et al. | 343/7.3 |
| 3,141,162 | 7/1964 | Moretti et al. | 343/7.3 X |
| 3,174,147 | 3/1965 | Vosburgh et al. | 343/12 R |
| 3,354,455 | 11/1967 | Briggs et al. | 343/7.3 |
| 3,611,377 | 10/1971 | Rittenbach | 343/12 R |
| 3,766,555 | 10/1973 | Watt | 343/5 DP X |
| 3,875,549 | 4/1975 | Stenersen et al. | 343/7.5 X |
| 3,969,616 | 7/1976 | Mimken | 343/7.3 X |

Primary Examiner—Malcolm F. Hubler
Attorney, Agent, or Firm—Eugene A. Parsons

[57] ABSTRACT

In conjunction with a doppler radar of the type having early and late gate, leading edge tracking apparatus (i.e., tracking the leading edge of the pulse reflected by the target), circuitry for switching from a leading edge tracking mode to a doppler count tracking mode and logic circuitry for counting doppler signals and changing the range a predetermined amount per signal to estimate the range of the leading edge of a target when the leading edge is obscured by transmitter pulse feedthrough to the receiver.

6 Claims, 3 Drawing Figures

SHORT RANGE RADAR TRACKING APPARATUS

BACKGROUND OF THE INVENTION

Range tracking apparatus for a doppler radar of the type having early and late gate, leading edge tracking means, such as that illustrated in U.S. Pat. No. 4,063,238, issued Dec. 13, 1977, and assigned to the same assignee, are limited in their ability to accurately measure range when the return echo from a target approaches the saturated receiver region resulting from transmitter feedthrough or close range clutter. In many instances it is desirable to have the ability to measure these short ranges accurately to zero or approximately thereto.

SUMMARY OF THE INVENTION

The present invention pertains to short range tracking apparatus for use with a doppler radar of the type having early and late gate, leading edge tracking means and more specifically to short range tracking apparatus wherein the range of the leading edge of a target is estimated by switching the tracking means from a leading edge tracking mode to a doppler count tracking mode when the leading edge of the video return signal is coincident with the trailing edge of the transmitter feed through pulse and changing the range a predetermined amount for each doppler count during the doppler count tracking mode.

It is an object of the present invention to provide short range tracking apparatus capable of providing range tracking to, or approximately to, zero range.

It is a further object of the present invention to provide accurate short range tracking in a doppler radar of the type having early and late gate, leading edge tracking means when the leading edge of the pulse being tracked is within the transmitter feedthrough, or receiver saturation region, and/or the leading edge of the early gate is at zero range.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
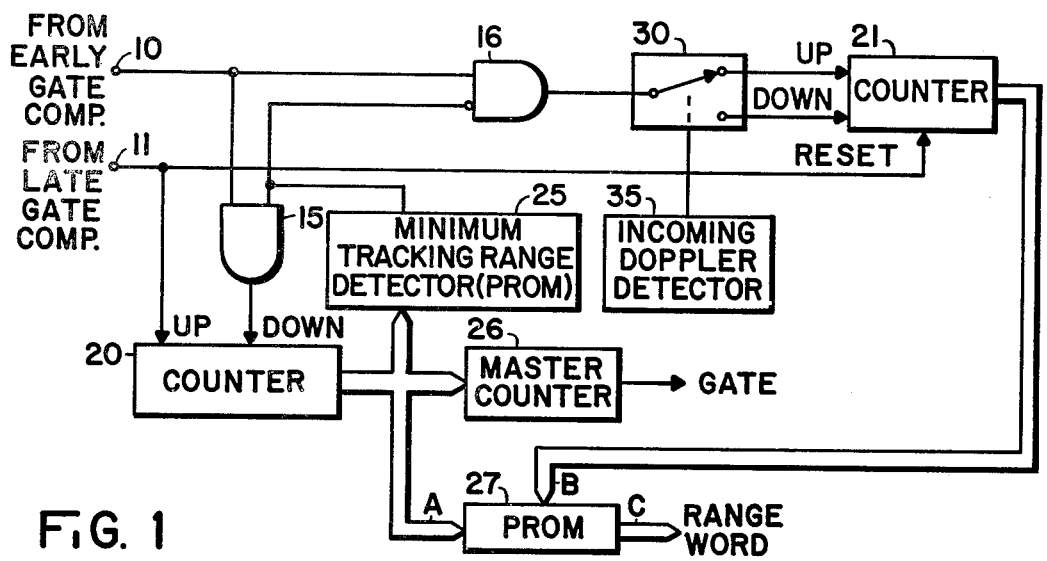
FIG. 1 is a block diagram of short range tracking apparatus embodying the present invention, which apparatus is utilized in conjunction with a doppler radar of the type having early and late gate, leading edge tracking means with threshold crossing detectors for developing each gate.

In the early and late gate, leading edge tracking apparatus of the doppler radar described in U.S. Pat. No. 4,063,238, sample and hold circuits operate as the early and late gates and sample the return signals from a target at specified times after the transmitter pulse, corresponding to a specified range. The doppler signals passing through the early and late gates are then filtered in doppler filters and applied to a comparator or threshold circuit. The threshold circuit supplies an output pulse whenever the output of the doppler filter exceeds the predetermined threshold voltage. In the embodiment of the present invention illustrated in FIG. 1 the threshold corssings from the early gate are applied to an input terminal 10 and threshold crossings from the late gate (inhibited when early gate crossings are occurring) are applied to an input terminal 11. While the apparatus of the '238 patent utilizes threshold circuits to produce output pulses from doppler cycles passing through the early and late gates, it should be understood that one skilled in the art might devise other circuitry for producing such pulses, or for producing pulses compatible with different embodiments of the present invention, and it is intended that the terminology used herein will not limit the scope of the invention.

Pulses applied to the input terminal 10 are supplied through a conductor to one input of an AND gate 15 and to one input of an AND gate 16. Pulses supplied to the input terminal 11 are conducted to an up counting terminal of an up-down counter 20. The input terminal 11 is also connected to a reset input of a second up-down counter 21. An output of the AND gate 15 is connected to a down counting terminal of the counter 20. The counters 20 and 21 are essentially utilized to convert serial information to parallel information or digital words and it will be understood by those skilled in the art that many other devices might be utilized. The counter 20 has a plurality of outputs which supply the parallel output signal or digital word, and all of these parallel outputs are applied to a plurality of inputs of a minimum tracking range detector (PROM) 25, a master counter 26 and a programmable read only memory (PROM) 27. Since the number of outputs from the counter 20 will depend upon the accuracy of the system, the number of positions or steps of range required no specific number have been illustrated and the connections between the counter 20 and detector 25, master counter 26 and PROM 27 are illustrated by large arrows. An output of the detector 25 is connected to a second input of the AND gate 15 and to an inverting input of the AND gate 16. The output of the AND gate 16 is connected through a two position switch 30 to an up counting terminal of the counter 21 or to a down counting terminal thereof. An incoming doppler detector 35, (which determines whether the droppler is produced by an incoming or outgoing target and may be, for example, a synchronous detector working with two doppler signals in quadrature), is connected to operate the switch 30 so that the output of the AND gate 16 is connected to the up counting terminal for incoming doppler signals and to the down counting terminal for outgoing doppler signals. The parallel outputs of the counter 21 are connected to a second input of the PROM 27. The master counter 26 supplies information to the early and late gates, as described in the '238 patent. The PROM 27 provides a range word out which incorporates the leading edge tracking mode range indication and the doppler count tracking mode range indication.

In the leading edge tracking mode of operation the circuitry operates as described in the '238 patent. To briefly summarize that operation, when doppler signals cross the threshold of the early gate comparator an output is produced which is applied to the input terminal 10. The output is supplied from the input terminal 10 through AND gate 15 to the down counting terminal of counter 20. The counter 20 will count down one count for each doppler threshold crossing. The output from the counter 20 is loaded into the master counter 26 which provides an output to produce the early and late gates. Down counts in the counter 20 result in producing the early and late gates sooner in time (or closer in range). Generally, the early gate moves in time slightly more than the target moved to produce the doppler cycle, consequently, the early gate will move away from the target until there are no further threshold crossings and the down counts to the counter 20 will stop. When the early gate threshold crossings stop, the late gate threshold crossing circuit is enabled and these signals are supplied to the input terminal 11 and to the up counting terminal of the counter 20. Consequently, the early and late gates are produced later in time causing the early gate threshold crossings to occur again. This dithering operation continues with the early and late gate comparator signals keeping the trailing edge of the early gate on the leading edge of the target video. This relationship is illustrated in the waveforms of FIG. 2A for a point source target and in the waveforms of FIG. 3A for an extended target.

Figure 2:
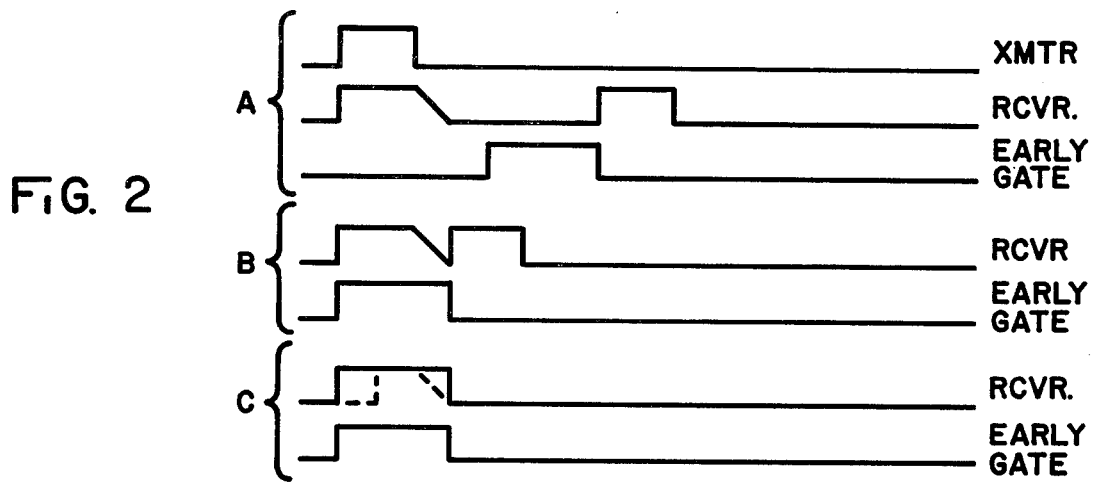
FIGS. 2A, B, and C are tracking waveforms illustrating the operation of the apparatus of FIG. 1 while tracking a point source target.
Figure 3:
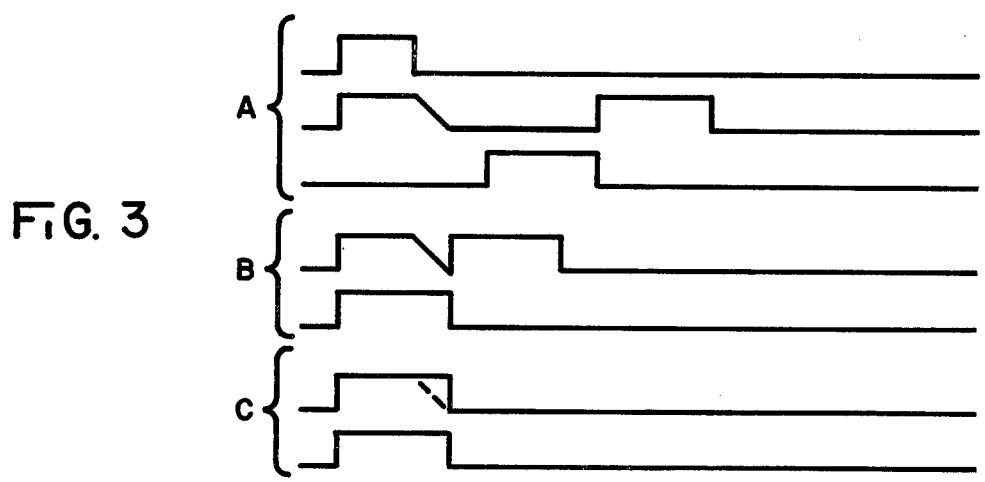
FIG. 3A, B and C are tracking waveforms illustrating the operation of the apparatus of FIG. 1 while tracking an extended target.

The waveforms of FIGS. 2B and 3B illustrate the target video/early gate relationship when the leading edge of the target video reaches the receiver saturation region and the early gate leading edge is at zero range. This is a special case where the leading edge of the early gate reaches zero and the trailing edge is still at least partially beyond, or outside, the receiver saturation region, i.e., the width of the early gate is greater than the width of the receiver saturation region. In this special case the minimum tracking range detector 25 can be a zero range detector and could be, for example, simply an OR gate which supplies a zero output when all of the inputs are zero. When the outputs of the counter 20 are all at zero the output of the detector 25 is also zero and the AND gate 15 prevents signals from being applied to the down counting terminal of the counter 20. This maintains the counter 20 output at zero and the leading edge of the early gate remains fixed at zero range. Simultaneously, the zero signal out of the detector 25 is inverted and applied to the AND gate 16 to open that gate so that signals from the terminal 10 may pass therethrough to the switch 30. If the doppler detector 35 senses that the doppler signals are incoming, the switch 30 will be in the position illustrated and pulses from the AND gate 16 are applied to the up counting terminal of the counter 21. The counter 21, which was initially at zero, starts to count up. Each count corresponds to a definite movement of the target as expressed by the equation:

$$D = C/(2F_T + 1)$$

where
C = velocity of light;
$F_T$ = transmitter frequency;
D = distance target moves per cycle of doppler.
As an example, if the transmitter frequency is 1750 megahertz D will equal 0.28 feet per doppler cycle. The counter 21 continues to count the early gate threshold crossings as the video pulse moves into the saturated receiver region. All video sampling, however, is done outside of the saturated receiver region. This counting continues until the video pulse trailing edge is in time coincidence with the early gate trailing edge, as illustrated in FIGS. 2C and 3C. As can be seen from FIG. 2C, a point source target cannot be tracked to zero range since the trailing edge thereof comes into coincidence with the trailing edge of the early gate before the leading edge reaches zero. This is a worst case condition for a point source target and will not generally occur in actual situations. FIG. 3C illustrates an extended target and more nearly illustrates an actual situation, where the leading edge of the extended target reaches zero simultaneously with or before the trailing edge becomes coincident with the trailing edge of the early gate. As an example, the extended target video pulse illustrated in FIG. 3 will be obtained when the transmitter pulse is 40 nanoseconds wide and the target is at least 10 feet long.

Should the target range start to increase before reaching zero (for example, due to a near miss) it will not affect the early gate threshold crossings, because the early gate is stationary, but it will affect the doppler frequency. For targets moving away from the radar the doppler frequency decreases and this change from incoming doppler signals to outgoing doppler signals is sensed by the doppler detector 35. The outgoing doppler signal causes the detector 35 to move the switch 30 from the up counting terminal to the down counting terminal so that the early gate threshold crossings produce a decreasing count in the counter 21. This decreasing count is an indication that the range of the target is increasing.

When the video pulse moves out in range sufficiently so that it no longer coincides with any portion of the early gate, the early gate threshold crossings stop and late gate threshold crossings are applied to the up counting terminal of the counter 20. The first count up from zero removes the zero output of the counter 20 so that a one is applied to the AND gate 15 from the detector 25 to allow early gate threshold crossings to be applied therethrough. Thus, the logic switches the apparatus back to the leading edge tracking mode. Since the detector 25 has a one at the output thereof the AND gate 16 is inhibited and the early gate threshold crossings can no longer be applied to counter 21. Simultaneously, the first late threshold crossing is applied to the reset of counter 21 and counter 21 is reset to zero.

In radar systems where the early gate pulse width is narrower than the receiver saturation region, the minimum tracking range detector 25 can not be an OR gate, since the trailing edge will be buried in the receiver saturation region when the leading edge is at zero and the doppler signal can not be sampled. Therefore, to insure proper sampling and, hence, tracking of the target when the receiver saturation region is wider than the early gate, the leading edge of the early gate must be halted before it reaches zero. This function can be provided by some device programmed to provide a proper signal output (zero in the embodiment shown) when the leading edge of the early gate reaches a predetermined range. Such a device might be, for example, a programmable read only memory (PROM). In the embodiment the leading edge tracking mode of operation can be stopped at any preprogramed range and the doppler count tracking mode will continue as set forth above.

The PROM 27 receives the outputs of counters 20 and 21 and derives a range word which is an indication of the range to the leading edge of the target. In this embodiment, the outputs from the counters 20 and 21 are the address lines of the PROM 27, which solves the equation:

$$RANGE\ WORD\ OUT = A + EARLY\ GATE\ WIDTH\ (FEET) - B \times 0.28\ FEET\ PER\ COUNT$$

where
A = counter 20 output;
B = counter 21 output.

When the output of the counter 20 reaches zero the leading edge of the early gate is also at zero but the tracking point (the trailing edge) is several feet out in range. Consequently this range increment must be added to the output of the counter 20. The output of the counter 21 (which indicates a change in tracking mode) must be subtracted from the previous range number to provide the actual range. While the figure 0.28 feet per count is utilized in the above example, it should be understood that this figure will change with the frequency of the radar being utilized, as previously described. While counters and a PROM are illustrated to solve the above equation, it will be apparent to those skilled in the art that this equation could be solved using standard digital techniques and, in some instances where the PROM memory capacity becomes excessively large, may be preferred.

Thus, short range tracking apparatus is disclosed for use with a doppler radar of the type having early and late gate, leading edge tracking means. The short range tracking apparatus provides the capability for estimating the range of the leading edge of a target when the leading edge is actually obscured by the saturated receiver region resulting from transmitter feedthrough or close range clutter. Previously, the minimum range at which a pulse radar could accurately range track has been limited by the width of the transmitter pulse, transmitter leakage into the receiver, and receiver recovery time. This invention provides for accurate range tracking approaching zero feet, for extended targets, even though most of the return signal from the target is within the saturated region of the receiver. While the present apparatus is disclosed in conjunction with a specific doppler radar, it should be understood that the concept may be useful with many other embodiments of range tracking apparatus in doppler radars. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. In a doppler radar of the type having early and late gate, leading edge tracking means with threshold crossing detectors for developing each gate, short range tracking apparatus comprising:
   (a) switching means for switching the tracking means from a leading edge tracking mode to a doppler count tracking mode;
   (b) counter means connected by said switching means to receive threshold crossings from the early gate circuitry; and
   (c) range indicator means connected to said counter means for receiving an output therefrom and changing the range a predetermined amount for each threshold crossing.

2. Short range tracking apparatus as claimed in claim 1 wherein the counter means includes an up-down counter.

3. Short range tracking apparatus as claimed in claim 2 wherein the switching means includes means for differentiating between incoming and outgoing doppler signals and for connecting the counter to count up during incoming doppler signals and down during outgoing doppler signals.

4. Short range tracking apparatus as claimed in claim 3 wherein the indicator means includes a programmable read-only memory connected to decrease the range a predetermined amount for each threshold crossing due to an incoming doppler signal and increase the range a predetermined amount for each threshold crossing due to an outgoing doppler signal.

5. In a doppler radar of the type having early and late gate, leading edge tracking means, a method of estimating the range of a target during short range tracking comprising the steps of:
   (a) counting doppler cycles from the early gate circuitry; and
   (b) changing the range by a predetermined distance for each doppler cycle.

6. A method as claimed in claim 5 including the steps of determining whether the doppler cycles are from incoming or outgoing doppler signals and decreasing the range the predetermined amount for incoming doppler signals and increasing the range the predetermined amount for outgoing doppler signals.

* * * * *